United States Patent [19]

Alley, Jr. et al.

[11] 4,018,085

[45] Apr. 19, 1977

[54] AMPLIFYING RIBBON EXTENSOMETER

[75] Inventors: Vernon L. Alley, Jr., Newport News; Austin D. McHatton, Hampton, both of Va.

[73] Assignee: The United States of America as represented by the Administrator of the National Aeronautics and Space Administration, Washington, D.C.

[22] Filed: Nov. 14, 1975

[21] Appl. No.: 632,112

[52] U.S. Cl. .............................................. 73/88 R
[51] Int. Cl.² ......................................... G01B 5/30
[58] Field of Search ...................... 73/88 R, 141 A; 116/DIG. 34; 33/147 D

[56] References Cited

UNITED STATES PATENTS

| 812,181 | 2/1906 | Cantelo | 33/147 D |
| 1,125,236 | 1/1915 | Whiting | 73/88 R |
| 1,133,400 | 3/1915 | Rechniowski | 73/88 R |

*Primary Examiner*—James J. Gill
*Assistant Examiner*—Anthony V. Ciarlante
*Attorney, Agent, or Firm*—Howard J. Osborn; Wallace J. Nelson; John R. Manning

[57] ABSTRACT

A self-contained, nonelectrical strain gage capable of amplifying strain inputs and preserving the maximum strain measurement for later observance.

12 Claims, 11 Drawing Figures

FIG. 1
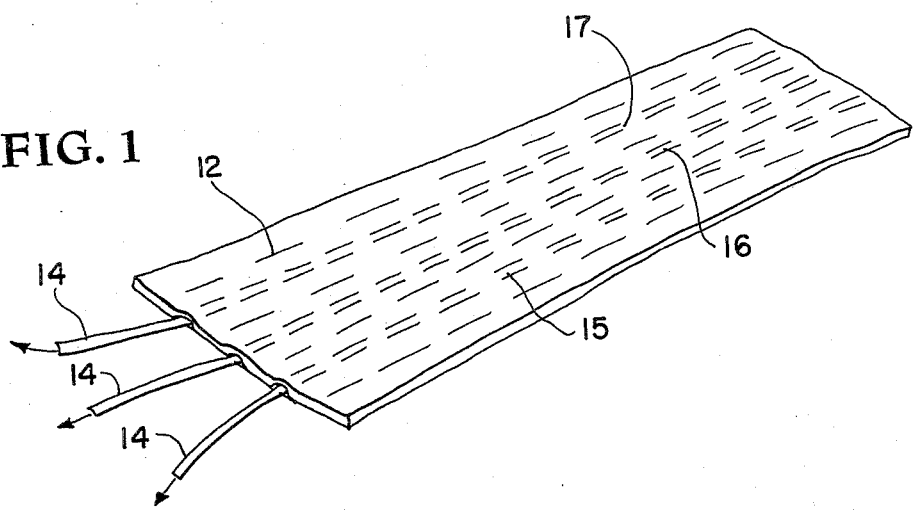
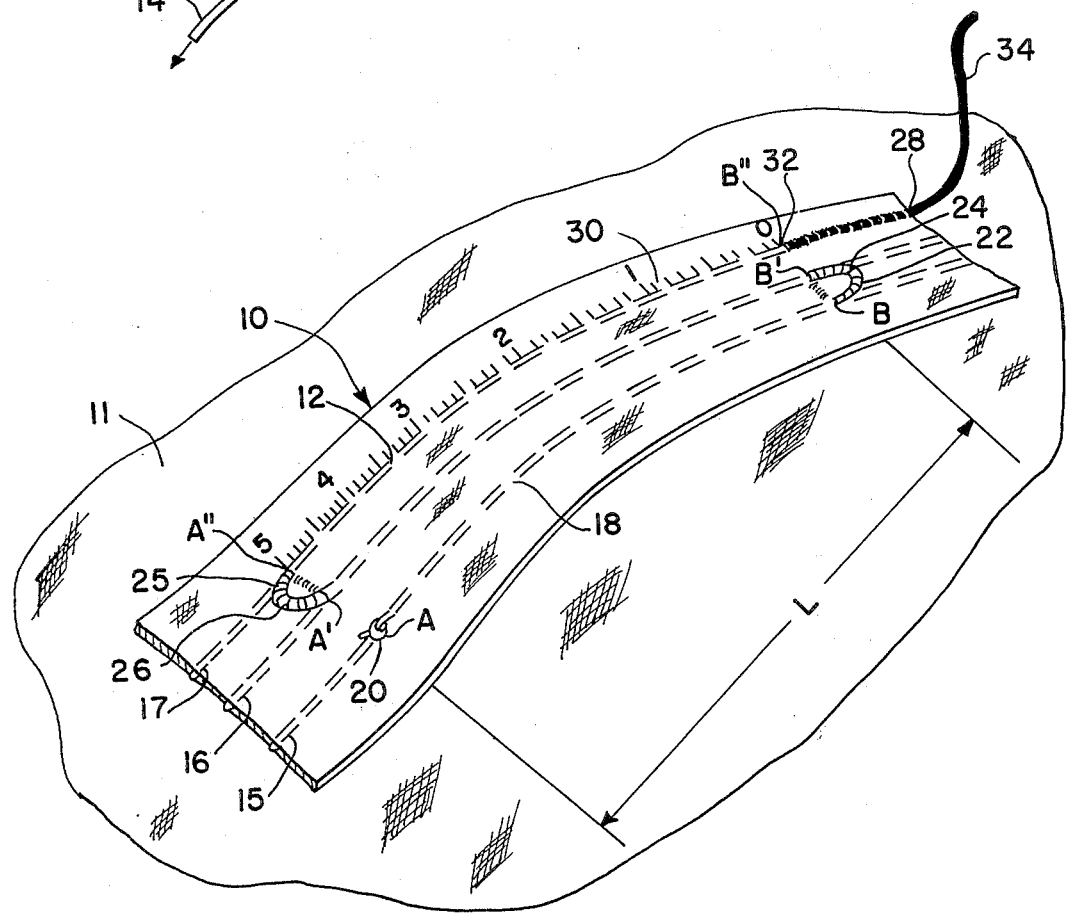
FIG. 2

AMPLIFYING RIBBON EXTENSOMETER

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

This invention relates generally to a lightweight, flexible device for measuring the maximum strain or elongation of a substance subject to loads or for measuring maximum relative movements between adjacent objects, and more particularly to a lightweight, self-contained, elastic strain gage capable of amplifying strain experienced by the relatively high elastic modulus, low strain, synthetic materials used in parachutes and other stressed fabric structures.

DESCRIPTION OF PRIOR ART

In order to test and evaluate the structural integrity of parachutes, coated-fabric inflatable airfoils, and other similar fabric devices, it is necessary to ascertain the elongation, or strain, experienced by the materials of which the device is constructed. Strain testing is especially important in areas of stress concentration, such as seams and corners, as failure usually occurs at these points. Testing under simulated or actual operating conditions is the preferred method.

A strain-measuring device suitable for operational testing must be self-contained, flexible, of low profile, and capable of preserving an indication of maximum strain experienced by the tested material for later observation. Additionally, it is desirable that such a strain gage be of low mass and have an operating, or extraction, force which is small in relation to the force needed to strain the test material. The strain measuring device must further be able to accurately measure the strain experienced by high elastic modulus, low-elongation materials, such as Dupont's Kevlar, which are frequently used in modern stressed fabric structures. These new materials frequently exhibit maximum strains of 5 percent or less before failure. The low elongation characteristics of these new fibers makes accurate strain measurements over short spans of fabric difficult as the total fabric elongation is insufficient for accurate gage readings, particularly under light load conditions.

Several presently available strain gages meet the above-listed, self-contained, flexibility, low profile and measurement preservation criteria; however, none are capable of accurately measuring short span strain in low elongation material. Existing gages employ an extensible base and an inextensible non-amplifying indicator. In operation, the base is attached to the material to be tested such that the base stretches with the test material as it undergoes strain. Strain measurements are taken by noting the relative displacement between the extensible and inextensible indicator. Some commercially available strain gages employ the test material as the extensible base. The inherent weakness in existing strain gages lies in the fact that the test material elongation equals the strain scale deflection, thus degrading the accuracy of strain measurements over short spans of low elongation material as hereinabove described. Ordinary resistance gages currently used with metallic materials are not suitable for use in fabric testing as they exhibit their best performance at strain levels considerably less than 1 percent and require relatively high operating forces.

Attempts have been made to accurately measure the strains experienced by low elongation material through the use of longer strain gages in order to achieve the necessary total displacement. However, such a technique results in an average strain reading over the entire gage length whereas the local strains experienced within the gage length may vary widely. This variation is especially evident in stressed fabric structures in which the highest stresses, hence, strains, occur immediately adjacent to seams and corners. Invariably the situs of these localized high stress areas is too small to accommodate an existing gage of length sufficient to obtain an accurate strain measurement. This problem can be eliminated by providing an amplifying strain gage for converting small strain inputs into readable indicator displacements.

SUMMARY OF THE INVENTION

Accordingly, one object of the present invention is to provide a self-contained, flexible, low profile low mass and low operating force measurement preserving strain gage for testing stressed fabric structures under operating conditions.

Another object of the present invention is to provide an amplifying strain gage wherein indicator displacement is larger than the strain input.

Yet another object of this invention is to provide an accurate amplifying strain gage suitable for operational measurement of maximum strains experienced by low elongation fabric in areas of stress concentration.

A further object of the present invention is to provide an amplifying device for measuring and preserving an indication of maximum relative displacements between adjacent objects subject to shock loads or shipping damage.

A still further object of the present invention is to provide an amplifying device for measuring and preserving an indication of biomedical measurements such as degrees of mobility and physiological expansions over extended periods of observation.

According to one embodiment of the present invention the foregoing and other objects are attained by providing a woven elastic base ribbon in which a plurality of elastic warp yarns have been removed. A relatively inextensible indicator thread is attached at one end to the base ribbon and woven into the base ribbon in place of one of the removed elastic warp yarns. Upon completion of the first weave, the indication thread is withdrawn from the base ribbon weave, formed into a 180° half loop and again woven into the base ribbon in place of another removed elastic warp yarn. Each succeeding weaving operation proceeds in the opposite direction from the immediately prior operation with the result that the interwoven indicator filament travels back and forth lengthwise along the base ribbon. The number of traverses made by the indicator filament is dictated by the desired amplification ratio. The 180° half loops connecting each succeeding traverse of the indicator thread are slidably secured to the surface of the base ribbon. The remaining end of the indicator thread is left free and is provided with a marked (on the section of thread which comprises the last woven traverse) for determining the relative movement between thread and base ribbon upon extension of the base ribbon. A strain scale calibrated in any convenient dimension is attached to the base ribbon opposite the thread marker.

Various other objects and advantages of this invention will appear from the following detailed description of several embodiments thereof when considered in connection with the accompanying drawings.

BRIEF DESCRIPTION OF THE DRAWINGS

FIG. 1 is a perspective view of the elastic base ribbon showing the extraction of elastic warp yarns;

FIG. 2 is a perspective view of a strain gage prior to undergoing strain constructed in accordance with the present invention and affixed to a test material sample;

DESCRIPTION OF THE PREFERRED EMBODIMENT

Figure 3:
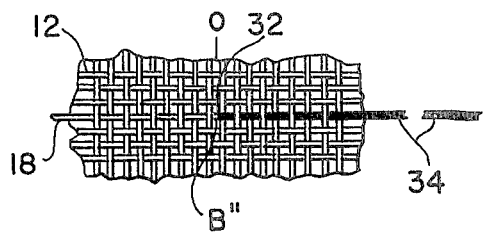
FIG. 3 is a fragmentary view of that portion of the indicator thread containing a scale reading marker.

Referring now to the drawings wherein like reference characters designate identical or corresponding parts, and more particularly to FIG. 1 and 2, the extensible strain gage base designated generally by the reference numeral 10 is constructed of a length of elastic ribbon 12 from which a plurality of elastic warp yarns 14 have been removed, thereby creating warp yarn voids 15, 16 and 17 in the base ribbon weave. Base ribbon 12 may be constructed of any woven elastic material having straight elastic warp yarns, such as dressmaker's elastic.

The desired strain gage amplification factor, or gain, dictates the number of elastic warp yarns 14 to be removed as the number of traverses made by indicator thread 18 equals the strain gage gain and each void left by the removal of one warp yarn provides space for weaving one traverse of indicator thread 18 into the base ribbon. In order to preserve the contraction characteristics of base ribbon 12, no more than three-eighths of the total number of warp yarns should be removed. In the embodiment shown in FIG. 2, the strain gage gain is 3, hence for every unit of base ribbon extension, the indicator thread will move three units.

Indicator thread 18, constructed of any relatively inextensible material such as polyester, nylon or even annealed wire filaments, is woven into void 15 after first securing one end to base ribbon 12 at point A by means of a knot 20 or other workable means. Indicator thread 18 exits the weave of void 15 at point B and its lead direction is reversed by forming it into a 180° half loop 22 so sized as to aline thread 18 with void 16 for weaving in the opposite direction. Half loop 22 consists of nothing more than a 180° turn of thread 18 which is slidably secured to base ribbon 12 by lashings 24 or other suitable low-friction means such as pulley-sheaves, hooks, tubes, beads or buttons. Indicator thread 18 is then woven into void 16 from point B' to point A' whereupon it again exits the base ribbon weave and is formed into another 180° half loop 24 similar in nature to half loop 22 and slidably secured to base ribbon 12 by lashings 26. Indicator thread 18 is then inserted into void 17 at point A'' and woven past point B'' until it exits the base ribbon weave at the terminus 28 of void 17.

Indicator thread 18 terminates in reset tail 34 which extends from base ribbon 12, a distance at least equal to A''B''. Reset tail 34 is used to pull indicator thread 18 back through the weave of base ribbon 12 to its original starting position after the gage has been strained; consequently, the use of tail 34 is optional on gages intended for a single use.

Referring now to FIGS. 2 and 3, strain scale 30 is applied to base ribbon 12 adjacent to void 17, by imprinting thereon or other suitable means, such that the zero strain position is alined with point B''. Indicator thread 18 is provided with a color interface marker 32 which is alined with point B'' and the zero strain position on scale 30 when base ribbon 12 is in an unstrained position and all slack is removed from indicator thread 18. Marker 32 is formed by dying indicator thread 18 and reset tail 34 a contrasting color from point B'' to the terminus of tail 34. A knot or other workable marking means capable of sliding through the weave of base ribbon 12 may be used in lieu of color interface 32.

As hereinabove recited, the number of traverses made by indicator thread 18 equals the amplification factor or gain of a strain gage made in accordance with the present invention. The gain to be used for a given strain test is optional for the user of the present invention and should be chosen after considering the expected strain characteristics of the material to be tested, the physical dimension of the area to be tested, and the desired strain gage size. Ideally, the gain selected should be only large enough to yield an accurately readable displacement of color interface marker 32. A larger gain is needed as the gage size; hence, the total test material elongation decreases in order to achieve sufficient marker displacement for accurate reading. In no case, however, should the gain be so large as to cause strain gage friction to substantially affect the strain experienced by the test material. It is worthy of note that strain gage friction, hence operating base, rises exponentially with the gain of the strain gage.

Points A, A' and A'' on base ribbon 12 are in alinement with each other as are points B, B' and B'', thus indicator thread traverse distance AB equals A'B' and A''B''. Distance AB comprises the active gage length, designated by the character L and is the distance with which any elongation of the test material is compared in order to arrive at a percentage strain value. The active gage length L may be any length desired by the user of the present invention; however, in order to measure strain experienced at areas of localized high stress concentration, it will be necessary to use a short active gage length to avoid averaging strains from areas not within the zone of localized high stresses into the resulting strain reading. Should the configuration of a particular strain gage make equality between indicator thread traverse distance impossible, the difference in distances should be minimized in order to reduce strain reading inaccuracies resulting from base ribbon elongation over the difference in distances.

When selecting a strain gage constructed in accordance with the present invention for a particular test application, the active gage length and gain must also be examined to insure that the maximum expected test material strain over the active gage length times the gain does not exceed the active gage length plus the anticipated increment of elongation $\Delta L$. Otherwise, the color interface indicator thread number 32 will be pulled past the strain scale, should maximum strain occur, resulting in strain indications requiring special interpretation methods which are not generally recommended.

Figure 5:
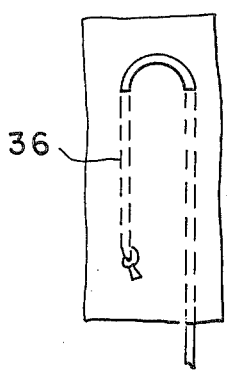
FIGS. 5 – 7 are diagrammatic plan views of several strain gages illustrating various amplifications factors and indicator thread traverse paths.
Figure 6:
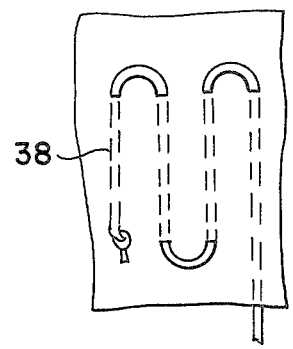
Figure 7:
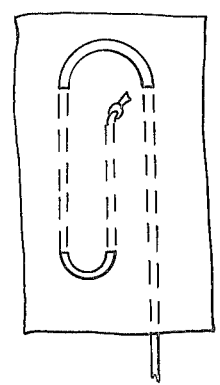

FIG. 5 illustrates diagrammatically another embodiment of the present invention in which a gain of two is achieved by utilizing two traverses of indicator thread 36. FIG. 6 illustrates a further embodiment having four traverses of indicator filament 38 and a gain of four. Thus, as stated above, any desired gain may be achieved by employing an equal number of indicator thread traverses. A further embodiment, shown in FIG. 7, uses an oval spiral traverse pattern as an alternative to the S-type traverse pattern of the preferred embodiment.

Figure 8:
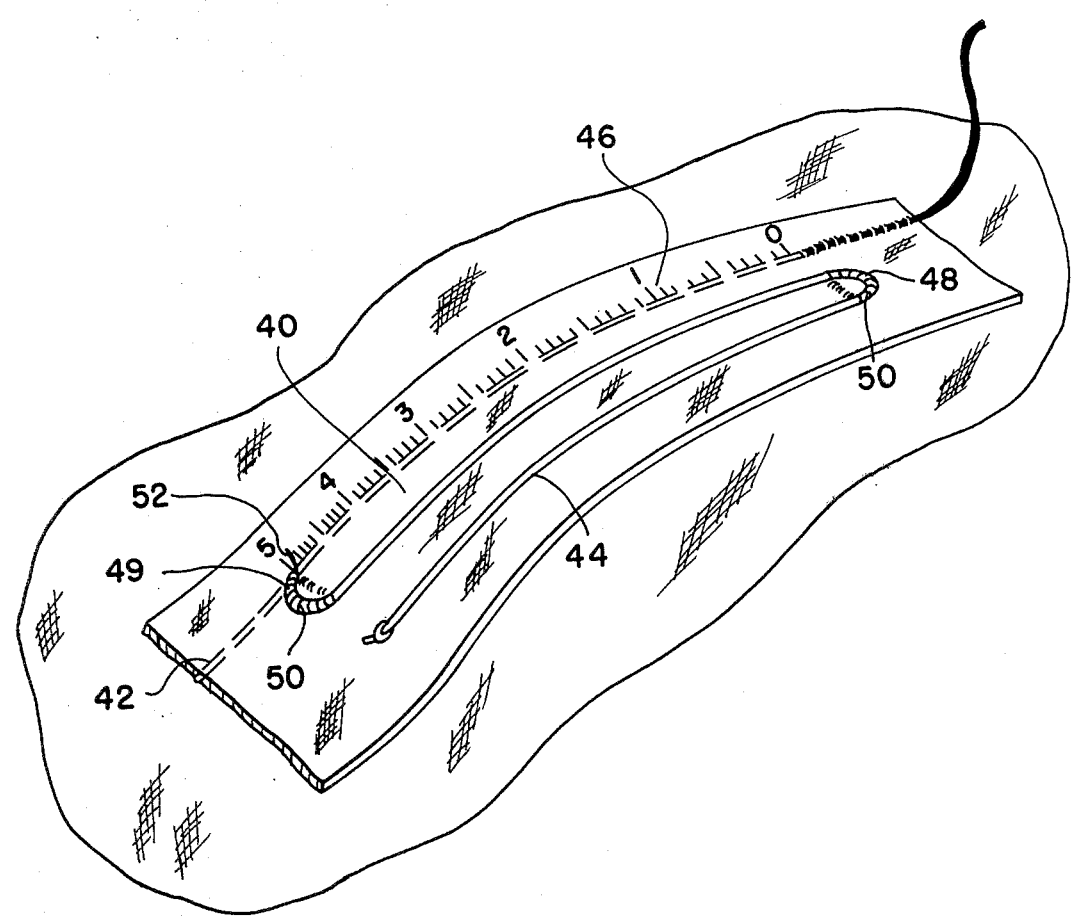
FIG. 8 is a plan view of a semi open-faced strain gage constructed according to the present invention.

When a gain of approximately five or higher is desired, a semi open-faced gage or a fully open-faced gage is preferred in order to help gage friction, hence operating force to a minimum. The semi open-faced embodiment of the present invention shown in FIG. 8 is constructed similarly to the embodiment of FIG. 2 except only one elastic warp yarn is removed from base ribbon 40 leaving a single void 42 into which only the final traverse of indicator thread 44 is woven. Scale 46 is applied to base ribbon 40 adjacent to void 42 in a manner similar to that in the embodiment of FIG. 3. In the semi open-faced embodiment, the lead direction of indicator thread 44 is reversed by passing the thread through 180° semi-circles of small diameter metal tubing bearings 48 and 49 in order to further reduce friction, hence operating force. Metal tubing bearings 48 and 49 are secured to base ribbon 40 by means of lashings 50 or other suitable means. The tube bearing immediately "upstream" of the final indicator thread traverse, tube bearing 49 in the embodiment of FIG. 8, is provided with a means of frictionally damping the movement of indicator thread 44 comprised of a strand of thread 52 or other suitable material passing through tube bearing 49 and secured internally thereto. Thread 52 allows indicator thread 44 to move relative to tube bearing 49 when the entire gage is strained but prevents "feedback" of the indicator thread through bearing 49 when the strain is relaxed.

Figure 9:
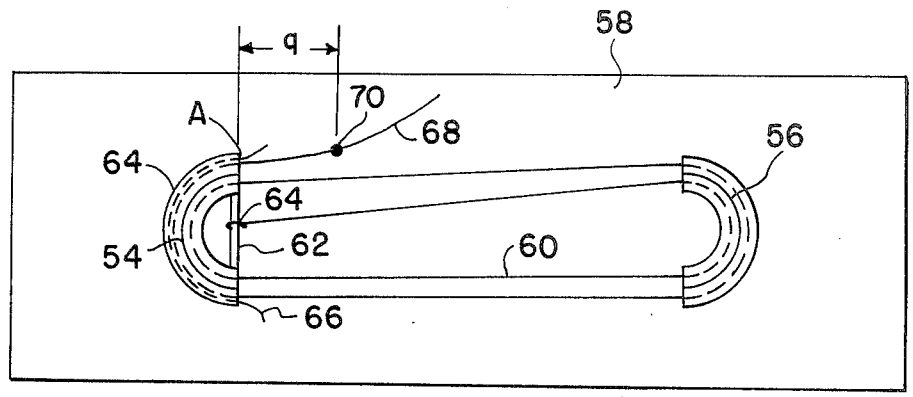
FIG. 9 is a plan view of a fully open-faced strain gage prior to undergoing strain.

FIG. 9 depicts a fully open-faced gage in which two 180° metal tubing bearings 54 and 56, similar to those shown in FIG. 8 and consisting of two tubes each, are secured to base ribbon 58 by any suitable means. Indicator thread 60 is secured to crossbar 62 of the tube bearing 54 by means of knot 64 and is then threaded spirally through the tubes of bearings 54 and 56 beginning with the tubes of smallest curvature. The tube of largest curvature 64 of tube bearing 54, the last tube through which indicator thread 60 passes, is provided with thread 66 internally secured therein for purposes of frictionally damping the movement of indicator thread 60 in a manner similar to that employed in the semi open-faced embodiment of FIG. 8. The end A of tube 64 through which indicator thread tail 68 exits is designated the zero reference point of the strain gage. Indicator thread tail 68 is provided with a reference point 70 such as a knot or dot of color for purposes of determining the strain experienced by the gage. Distance $p$ is that distance between zero reference point A and indicator thread reference point 70 when indicator thread 60 is everywhere taut and prior to the gage experiencing strain.

Figure 10:
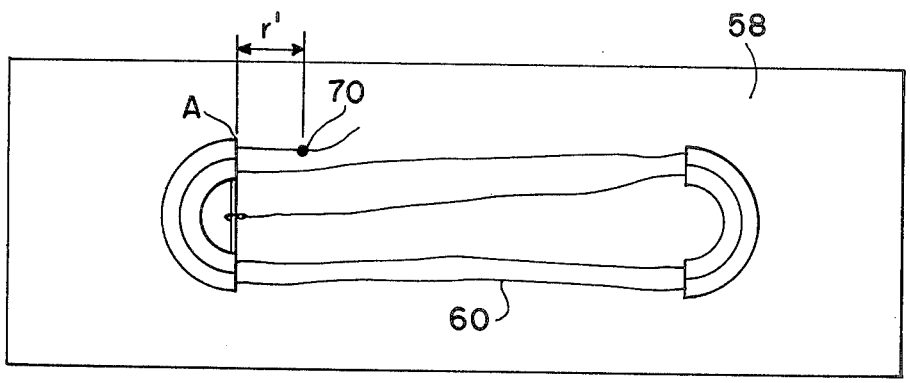
FIG. 10 is a plan view of a fully open-face strain gage after undergoing strain and wherein the elastic base ribbon has returned to its relaxed dimensions.

FIG. 10 shows the open-faced gage after it has undergone strain and base ribbon 58 has returned to its approximate original dimension. Distance $r'$ is the post-strain dimension between zero reference point A and indicator thread reference point 70.

Figure 11:
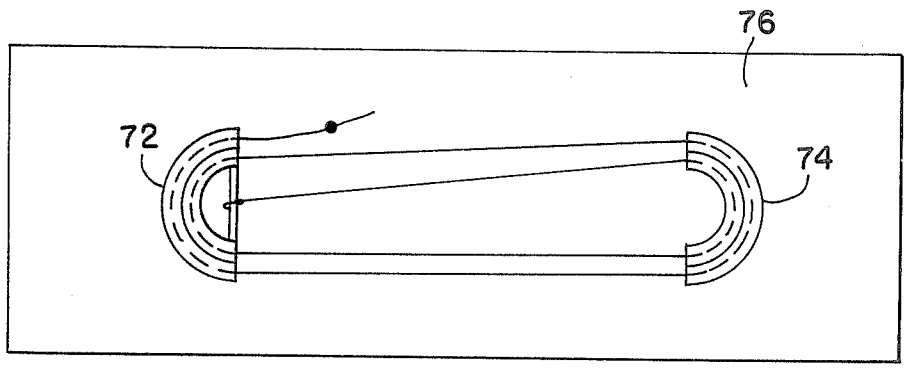
FIG. 11 is a plan view of a fully open-faced strain gage wherein the material to be tested serves on the extensible base means in place of an elastic base ribbon.

FIG. 11 shows yet another embodiment of the present invention wherein an open-faced strain gage is constructed by securing metal tube bearings 72 and 74 directly to the material to be strain tested rather than to an elastic base ribbon, thus resulting in a strain gage of lighter weight and lower profile than the embodiment shown in FIG. 10. Other details of this embodiment are identical with that of the embodiment of FIG. 10.

OPERATION

Figure 4:
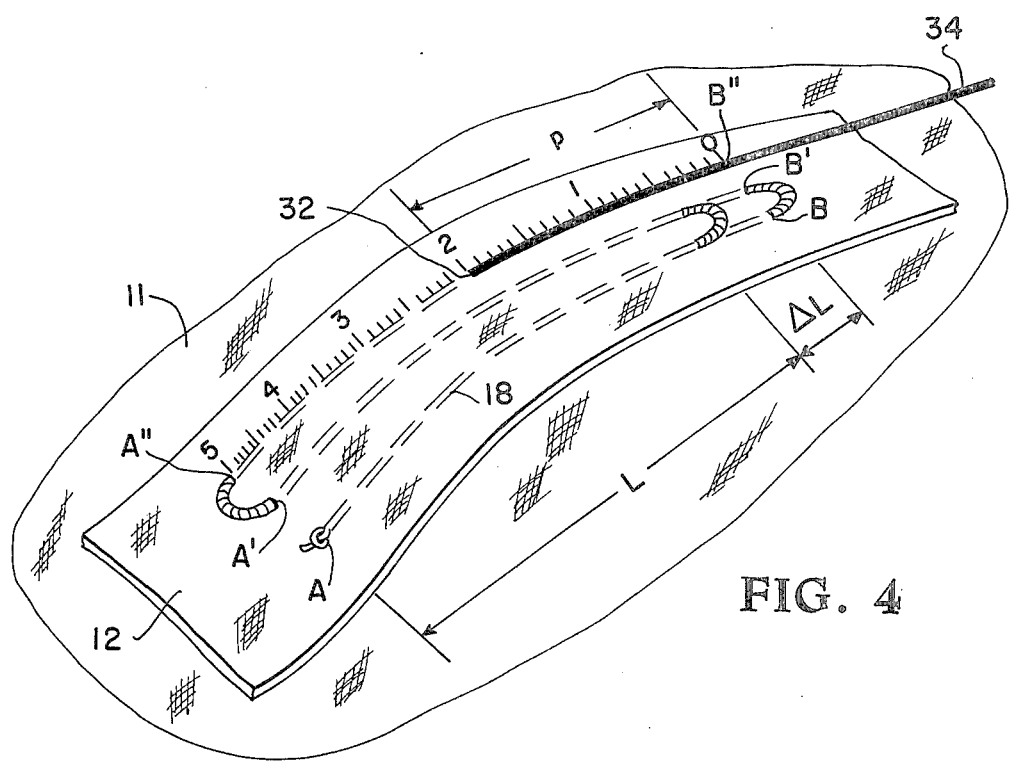
FIG. 4 is a plan view of a strain gage constructed according to the present invention and undergoing strain.

In operation, strain gage 10 is attached to the material to be tested, as designated by reference numeral 11, such that the gage strain axis which is parallel to the elastic warp yarns of base ribbons, is parallel to the direction of the strain to be measured. Strain gage 10 may be attached to the test material 11 by sewing, gluing, or other workable means. All slack is removed from indicator thread 12 by pulling on reset tail 34, thus alining color interface marker 32 with the zero division of strain scale 30. Referring now to FIG. 4, as test material 11 elongates due to stresses imposed thereon, base ribbon 12 elongates, hence the distance between A–A'' and B–B'' also increases. This increase designated $\Delta L$, is equal to the increase in length of the test material under base ribbon 12 and between points A–A'' and B–B''. In order for points A–A'' and B–B'' on base ribbon 12 to grow further apart, inextensible indicator thread 18 must move relative to the base ribbon. The movement of indicator thread 18, hence color interface number 32, relative to base ribbon 12 and strain scale 30, is proportional to and serves as a visual readout of the strain experienced by test material 11. Friction between the indicator thread and base ribbon weave prevents the thread from moving relative to the weave after the maximum strain level is experienced by the test material and base ribbon 12 has returned to its unstrained dimensions, thus the maximum strain reading is preserved for observation. Reset tail 34, if provided, is used to reset color interface marker 32 to zero in order to reuse the strain gage.

The design gain, equal to the number of traverse of indicator thread 18 as hereinabove described, is constant so long as strain gage 10 is under strain and the observed strain is the maximum strain experienced up until the time of reading. Under these circumstances the strain reading is linear.

However, when the gage is strained and allowed to return to its unstrained position for subsequent reading of the maximum strain experienced, the design gain occurs only in the first small increment of elongation and contraction experienced by the gage. As the strain increases the gain decreases due to the stretching and subsequent contraction of base ribbon 12 and strain scale 30 during the strain cycle. Consequently, the present invention exhibits two types of gain during a typical strain cycle: the design or nominal gain ($K_o$), equal in value to the number of traverses of the indicator thread, and the instantaneous gain ($k_1$) for any given level of strain. The maximum strain experienced may be calculated from the unstrained dimension $r$, the position of color interface number 32 relative to the zero number of strain scale 30 when base ribbon 12 is relaxed after being strained, by applying the formula $$\epsilon = \frac{r}{K_o L - r}$$

where
- $r$ = the unstrained dimension between point B'' (zero number a strain scale 30) and color interface number 32
- $L$ = the active gage length
- $\epsilon$ = unit strain = ($\Delta L/L$)
- $\Delta L$ 32 increase in active gage length due to strain
- $K_o$ = nominal gain of the strain gage
- $p = r(1 + \epsilon)$ = the dimension between point B'' and color interface number 32 when the gage is strained.

The above formula serves as the basis on which strain scale 30 is laid out and is obtained by summing the lengths over which indication thread 12 extends and equating the sum to the actual thread length $K_o L$ (i.e., the total length of thread 18 from knot 20 to color interface 32):

$$(K_o - 1)(L + \Delta L) + L + \Delta L - p = K_o L$$

Collecting terms and substituting $\epsilon = (\Delta L/L)$ and $r(1 + \epsilon)$ and solving for $\epsilon$ yields the above formula. The value for instantaneous gain at any level of strain may be obtained from the formula:

$$k_t = \frac{K_o}{(1 + \epsilon)^2}$$

The open faced gage shown in FIGS. 9 and 10 is read by substracting the post-strain dimension $r'$ from the pre-strain dimension of $q$ in order to arrive at the displacement $p$ of indication thread reference point 70 relative to zero reference point A as a result of the strain experienced by the gage. The strain experienced by the gage may then be calculated from the linear equation $$\epsilon = \frac{p}{K_o L}$$

It should be noted that the present invention may also be used as a simple recording extensometer in other fields. Possible uses include determining the maximum excursion of delicate packaged products within their containers during shipment, thus aiding in the resolution of insurance claims and determining maximum shock displacements in operating machinery.

A device constructed according to the present disclosure, therefore, has the capabilities of operating as a self-contained unit, accurately measuring strain experienced, preserving the maximum strain reading for later observance, functioning as a simple extensometer and interfering only minimally with the operation of a device to which it is attached. Obviously, numerous modifications of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A strain gauge comprising: an elongated inextensible member associated with a test object; said inextensible member traversing said test object in differing directions along a strain axis of the test object and being moveable relative thereto in response to strain of the test object, thereby providing means to amplify strain experienced by the test object; and means for indicating said amplified strain.

2. A strain gage as in claim 1, further comprising a scale means for determining the magnitude of strain experienced by said extensible base means.

3. A strain gage as in claim 1 wherein said means for indicating amplified strain further comprises means for preserving the maximum indicated amplified strain reading for later observance.

4. A strain gage as in claim 1 wherein said means for indicating amplified strain further comprises means for resetting said indicating means.

5. A strain gage as in claim 1 wherein said means for indicating amplified strain comprises a relatively inextensible thread with a marker thereon having one end secured to an extensible elastic ribbon base and one end free; and said means for amplifying strain comprises deployment of said inextensible thread in reverse directional configurations such that multiple traverses of said inextensible thread are alined with a strain axis of said elastic ribbon and are secured appropriately to said elastic ribbon such that the axis of said inextensible thread moves relative to said elastic ribbon when said elastic ribbon is extended.

6. A strain gage as in claim 5 wherein deployment of said inextensible thread in reverse directional configurations comprises 180° half loops of said inextensible thread and further comprises anti-friction means for securing said 180° half loops of said inextensible thread to said elastic ribbon.

7. A strain gage as in claim 6 wherein said anti-friction means for securing said 180° half loops of said inextensible thread to said elastic ribbon comprises tubing formed into 180° semi-circles and fixedly attached to said extensible base means.

8. A strain gage as in claim 1 wherein said means for indicating amplified strain comprises extensible means base comprising a woven elastic ribbon in which a plurality of elastic warp yarns running parallel to the strain axis are removed; a relatively inextensible thread having a marker thereon, slidably woven into said woven elastic ribbon in place of said removed elastic warp yarns, and having one end secured to said elastic ribbon and the other end free; and said means for amplifying strain comprises a plurality of traverses of said inextensible thread woven into said woven elastic ribbon and interconnected by a series of 180° half loops of said inextensible thread which exit the weave of said woven elastic ribbon and which are slidably secured to the surface of said woven elastic ribbon; and further comprising a strain scale affixed to said elastic ribbon; means for preserving the maximum indicated strain reading including sufficient frictional engagement of said inextensible thread by the weave of said woven elastic ribbon to prevent undesired relative movement between said inextensible thread and said woven elastic ribbon; and reset means including a tail attached to the free end of said inextensible thread by which said thread may be pulled through said woven elastic ribbon.

9. A strain gage, as in claim 8 wherein said woven elastic ribbon of elastic warp yarns, at least one of said warp yarns are removed and wherein the last traverse of said plurality of traverses of said inextensible thread is woven into said woven elastic ribbon in place of said removed elastic warp yarn.

10. A strain gage as in claim 1 wherein said means for indicating amplified strain comprises extensible base means, comprising material to be strained tested; a relatively inextensible thread with a marker thereon having one end secured to said material to be strained and one end free; and said means for amplifying strain comprises multiple traverses of said inextensible thread alined with the anticipated direction of strain of said material to be strain-tested and interconnected by 180° half loops of said inextensible thread which half loops are secured to said material to be strained such that the axis of said inextensible thread moves relative to said material to be strain-tested when said material is extended.

11. A strain gage as in claim 10 further comprising anti-friction means for securing said 180° half loops of said inextensible thread to said material to be strained.

12. A strain gage as in claim 11 wherein said anti-friction means for securing said 180° half loops of said inextensible thread to said elastic ribbon comprises tubing formed into 180° semi circle and fixedly attached to said base means.

* * * * *